US011829913B2

(12) United States Patent
Rayner et al.

(10) Patent No.: US 11,829,913 B2
(45) Date of Patent: Nov. 28, 2023

(54) FACILITATING ACTIVITY LOGS WITHIN A MULTI-SERVICE SYSTEM

(71) Applicant: SKYKICK, INC., Seattle, WA (US)

(72) Inventors: Christopher Rayner, Seattle, WA (US); Evan Richman, Seattle, WA (US); Bradley Younge, Denver, CO (US); Robert P. Karaban, Rochester Hills, MI (US); John Dennis, Oakland, CA (US); Todd Schwartz, Seattle, WA (US); Darren D. Peterson, Redmond, WA (US); Peter Joseph Wilkins, Troy, MI (US); Matthew Steven Hintzke, Woodinville, WA (US); Sergii Semenov, Kirkland, WA (US); Alex Zammitt, Riverview, MI (US); Philip Pittle, Seattle, WA (US)

(73) Assignee: SkyKick, Inc., Seattle, WA (US)

( * ) Notice: Subject to any disclaimer, the term of this patent is extended or adjusted under 35 U.S.C. 154(b) by 0 days.

(21) Appl. No.: 17/152,787

(22) Filed: Jan. 19, 2021

(65) Prior Publication Data
US 2021/0224712 A1    Jul. 22, 2021

Related U.S. Application Data

(60) Provisional application No. 62/963,024, filed on Jan. 18, 2020.

(51) Int. Cl.
G06Q 10/00         (2023.01)
G06Q 10/0631       (2023.01)
(Continued)

(52) U.S. Cl.
CPC ....... *G06Q 10/06315* (2013.01); *G06F 16/22* (2019.01); *G06F 16/288* (2019.01);
(Continued)

(58) Field of Classification Search
None
See application file for complete search history.

(56) References Cited

U.S. PATENT DOCUMENTS 6,349,321 B1 * 2/2002 Katayama ............. G06F 9/4881
                                                    718/103
8,856,382 B2  10/2014 Akolkar et al.
(Continued)

OTHER PUBLICATIONS

Jinesh Varia (Amazon Web Services—Architecting for The Cloud: Best Practices, Jan. 2011). (Year: 2011).*
(Continued)

*Primary Examiner* — Hafiz A Kassim
(74) *Attorney, Agent, or Firm* — Kilpatrick Townsend & Stockton LLP

(57) ABSTRACT

In one aspect of the present disclosure, activities of users within an IT service end user are recorded. A given record of a user activity may include an output of a command executed by the user, and execution information, input parameter(s) to the command, output of the command, and/or any other type of execution information. In implementations, intelligence may be built into a proxy module corresponding to the command to track an execution of the command started by the user. The execution of the command is captured and stored in a buffer such that another user within the IT service end user can review the execution of the command. In another aspect, user interfaces are provided to facilitate a user within an IT service end user to review activities in administering IT services by another user within the IT service end user.

16 Claims, 9 Drawing Sheets

(51) Int. Cl.
*G06Q 50/10* (2012.01)
*H04L 9/40* (2022.01)
*H04L 67/14* (2022.01)
*G06F 16/22* (2019.01)
*G06F 16/28* (2019.01)
*G06F 16/901* (2019.01)

(52) U.S. Cl.
CPC ......... *G06F 16/9024* (2019.01); *G06Q 50/10* (2013.01); *H04L 63/102* (2013.01); *H04L 63/105* (2013.01); *H04L 63/20* (2013.01); *H04L 67/14* (2013.01)

(56) References Cited

U.S. PATENT DOCUMENTS

| | | | |
|---|---|---|---|
| 8,909,622 B1* | 12/2014 | Emigh | H04L 41/069 |
| | | | 707/722 |
| 9,172,621 B1 | 10/2015 | Dippenaar | |
| 9,626,720 B2 | 4/2017 | Robbin et al. | |
| 9,930,103 B2 | 3/2018 | Thompson | |
| 10,397,232 B2 | 8/2019 | Hashmi et al. | |
| 10,572,935 B1 | 2/2020 | Murray et al. | |
| 11,741,410 B2 | 8/2023 | Rayner et al. | |
| 2005/0240621 A1* | 10/2005 | Robertson | H04L 41/5058 |
| | | | 707/999.102 |
| 2006/0178918 A1* | 8/2006 | Mikurak | G06Q 10/06315 |
| | | | 705/7.31 |
| 2007/0294663 A1* | 12/2007 | McGuire | G06F 8/45 |
| | | | 717/108 |
| 2009/0164933 A1* | 6/2009 | Pederson | G05B 19/409 |
| | | | 715/772 |
| 2010/0131942 A1* | 5/2010 | Nannenga | G06F 8/61 |
| | | | 717/176 |
| 2011/0099147 A1* | 4/2011 | McAlister | G06F 16/27 |
| | | | 707/639 |
| 2011/0119257 A1* | 5/2011 | Rajasekhar | G06F 16/951 |
| | | | 707/723 |
| 2014/0258910 A1* | 9/2014 | Liang | G06F 11/323 |
| | | | 715/772 |
| 2014/0278754 A1* | 9/2014 | Cronin | G06F 17/18 |
| | | | 705/7.29 |
| 2016/0301739 A1 | 10/2016 | Thompson | |
| 2018/0309819 A1* | 10/2018 | Thompson | H04L 67/10 |
| 2019/0068627 A1 | 2/2019 | Thampy | |
| 2019/0379672 A1 | 12/2019 | Hashmi et al. | |
| 2020/0026397 A1 | 1/2020 | Wohlstadter et al. | |
| 2020/0374308 A1 | 11/2020 | Chen et al. | |
| 2021/0149851 A1 | 5/2021 | Belezko et al. | |

OTHER PUBLICATIONS

U.S. Appl. No. 17/152,778, Non-Final Office Action, dated Sep. 20, 2021, 15 pages.
U.S. Appl. No. 17/152,778, Final Office Action, dated Apr. 13, 2022, 13 pages.
U.S. Appl. No. 17/152,778, "Non Final Office Action", dated Sep. 6, 2022, 14 pages.
U.S. Appl. No. 17/152,780, "Notice of Allowance", dated Apr. 11, 2023, 8 pages.
U.S. Appl. No. 17/152,780, "Non-Final Office Action", dated Dec. 22, 2022, 6 pages.
U.S. Appl. No. 17/152,778, "Final Office Action", dated Mar. 6, 2023, 14 pages.
U.S. Appl. No. 17/152,778, "Non-Final Office Action", dated Aug. 22, 2023, 14 pages.

* cited by examiner

FIG. 6

FACILITATING ACTIVITY LOGS WITHIN A MULTI-SERVICE SYSTEM

CROSS-REFERENCES TO RELATED APPLICATIONS

This application claims the priority to U.S. Provisional Patent Application No. 62/963,024, filed on Jan. 18, 2020, entitled with "CENTRALIZED CLOUD SERVICE MANAGEMENT", which is hereby incorporated by reference in its entirety for all purposes.

BACKGROUND OF THE INVENTION

Modern companies and associated IT services need to manage the software services that the companies provide to employees. This process can involve provision of a variety of computer services from a variety of vendors to employees of a company. IT consulting firms can be hired by companies to manage the IT environment for a company. The services can often have various differing user interfaces and data formats, which can require a high level of overhead to manage.

Onboarding process is commonly referred to a series steps to add a new employee to a company's system(s) and to facilitate the new employee to be able to perform his/her job at the company. Before the new employee starts at the company, this process typically involves administrative steps typically beginning with the IT service of the company receiving a ticket to add this new employee to the company's system(s). This typically involves adding the new employee to the payroll system, assigning a network ID to the new employee, and assigning an email address to the new employee. After these initial administrative steps, the onboarding process may involve determining which system(s) and/or network(s) the new employee should be able to access and not be able to access; and privilege and power the new employee should have on the system(s) and network(s) the new employee will have access to. These determinations will help create appropriate access level(s) and security level(s) for the new employees within the company's system(s). Then, the onboarding process may involve determinations which applications, software, and/or type of computing/communication device the new employee should use.

Different employees may need various access rights to different software services, and those access rights can vary based on for example an employee's role. For example, certain employees should be provided with different access to software services. However, the recognition of and management of groups of users as opposed to individual users can be challenging. The new employee's role typically includes one or more departments/groups the new employee will be in, one or more job tasks/functions the new employee will perform, one or more positions of this new employee in the company and/or within the departments/groups this new employee will be assigned to. For example, a new employee at accounting department holding a manager position will have a very different set up in the onboarding process than a new employee at sales department as a sales representative for the company.

Employee Onboarding system typically enables the IT service of the company to automate some of the repetitive and tedious manual creation of the new employee in the company's system(s) and automatically provisioning tasks to onboard new employees. Some conventional employee onboarding systems provide graphical tools for drawing workflows, but typically lack a well-defined structure. It could be a challenge to get a very specific protracted outcome using those tools. Also, some of the conventional employee onboarding systems are too general and do not provide enough functionality to improve/automate the onboarding process.

Embodiments of the invention address these and other problems, individually and collectively.

BRIEF SUMMARY OF THE INVENTION

In one aspect of the present disclosure, activities of users within an IT service end user are recorded. The recorded user activities may include one or more commands executed by the users. The recorded user activities are not merely recordings of user events that take place at certain time points in traditional user logs. In accordance with the disclosure, a given record of a user activity may include an output of a command executed by the user, and execution information, one or more parameters input to the command, information indicating a progress of the execution, information indicating one or more faults and/or exception of the execution, information indicating an execution context of the command, information indicating an application in which the command was executed, and/or any other type of execution information. In implementations, intelligence may be built into a proxy module corresponding to the command to track an execution of the command started by the user. The execution of the command is captured and stored in a buffer such that another user (such as a power user) within the IT service end user can review the execution of the command. In this way, individual users' activities within the IT service end user can be tracked and monitored for various purposes.

In another aspect of the present disclosure, user interfaces are provided to facilitate a user within a IT service end user 102 to review activities in administering IT services by another user within the IT service end user. For example, the user may be a power user within the IT service end user and the user under the review may be a regular user within the IT service end user 102. The interfaces may enable the power user to review not only a status of a command executed by the regular user, but other aspects of the execution such as an output of the execution, and one or more exceptions or faults caused by the execution and/or any other aspects within an application where the command was executed by the regular user. This can enable the IT service end user to better manage its staff within the organization to provide IT services to its customers.

A better understanding of the nature and advantages of embodiments of the present disclosure may be gained with reference to the following detailed description and the accompanying drawings.

BRIEF DESCRIPTION OF THE DRAWINGS

FIG. 1 is a system diagram showing an example environment where an example management system in accordance with the disclosure is applied in.

FIG. 4 shows another example method for just-in-time authentication of administrator or staff of an IT service end user according to one embodiment.

FIG. 6 illustrates one example interface to facilitate a user within the IT service end user to review user activities within the IT service end user in accordance with the present disclosure.

DETAILED DESCRIPTION OF THE INVENTION

Information Technology Service Management (ITSM) are the activities that are performed by an organization to design, plan, deliver, operate and control information technology (IT) services offered to clients of the organization. An information technology service management system ("management system" hereafter) in accordance with the present disclosure can facilitate an IT service provider to provide IT service to a customer of the IT service provider. In some embodiments, the management system in accordance with the present disclosure can provide a set of tools to enable the IT service provider to provide the IT service to the customer. The IT service provided by the IT service provider to the customer may include system/user administration, cloud service administration, cloud platform or infrastructure management, and/or any other services provided by the IT service provider to the customer. The management system in accordance with the disclosure can facilitate integrated access to one or more services employed by the customer of the IT service provider by collecting data related to for example, passwords, licenses, schedules, health, analytics, and general data that is stored within or provided by the services. The management system in accordance with the disclosure can collect this data in a cross service fashion and provide it in one or more simplified user interfaces to allow for easier management of the services through the management system.

I. Example System Architecture

Figure 1:
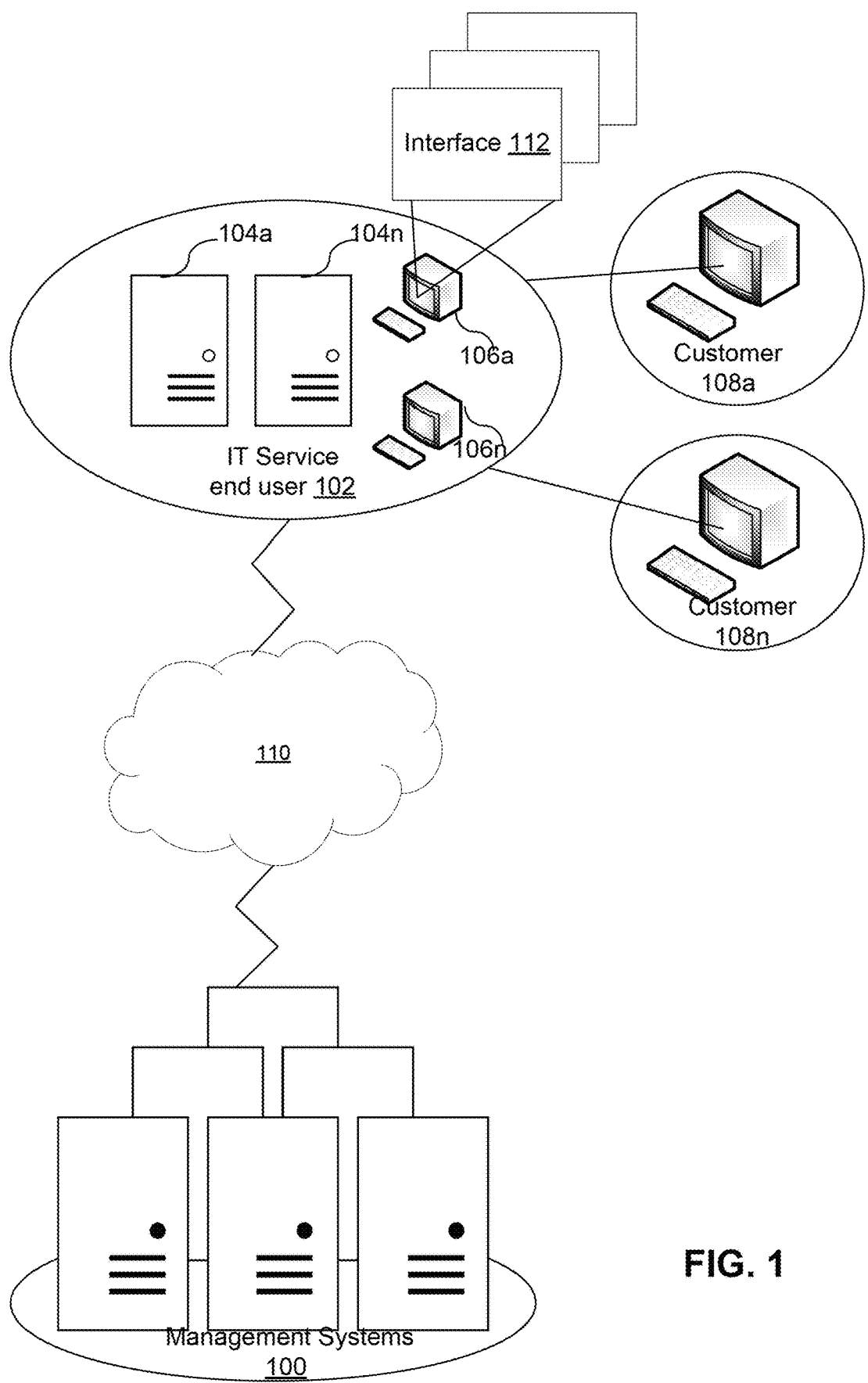

FIG. 1 is a system diagram showing an example environment where an example management system in accordance with the disclosure is applied in. As shown, the example environment can include an example management system 100. The example management system 100 can be configured to provide one or more software services to an IT servicer end user 102 to enable the IT service end user 102 to provision one or more IT and/or computing services to one or more customers of the IT end user 102, such as customers 108a to 108n as shown in this example. Although only one the IT service end user 102 is shown in FIG. 1, it should be understood that the management system 100 may be configured to provide the aforementioned software services to more than one the IT service end user 102. The IT service end user 102 can be an internal IT organization or an external IT services company or even individual person. The recipients of services provided by IT service end user, e.g., the customers 108a to 108n shown in this example, can be a line of business (LOB) organization within an enterprise, an entire company, a department within an entity, a store, a facility, and/or any other entities. For example, the IT service end user 102 can be a specialized IT service company that provides help-desk type service to multiple companies. As another example, IT service end user 102 can be an IT department within a company/or enterprise. By providing the aforementioned software services, the manage system 100 can assist the IT service end user 102 to place greater emphasis on the needs and the outcomes required by the business to improve employee. In some implementations, the software services may be provided by the management system 100 through one or more interfaces that can be accessed by the terminal(s) of the IT service end user 102, such as the interfaces 112 shown in FIG. 1.

As shown, the IT service end user 102 may employ one or more systems such as system 104a to 104n as shown in this example to facilitate the IT service provided to its customers 108a-n. Such system(s) can enable the IT service end user 102 to provision the one or more IT and/or computing services to the customers 108a-n of the IT service end user 102. The IT service end user 102 may include one or more terminals, such as terminal 106a to 106n shown in this example. Such terminal(s) can enable a user in the IT service end user 102 to interface with the management system 100 for provisioning the IT and/or computing services to the customers 108a-n.

As shown, one or more of the systems 104a-n and/or terminals 106a-n of the IT service end user 102 may be connected with the management system 100 through a network/cloud 110. The connections between the example management system 100 may be various, which may include internet, intranet (wireless or wired), and/or any other suitable connections. As mentioned above, the IT service end user 102 may be internal or external to a given customer, such as customer 108a or client 108n. When the IT service end user 102 is internal to the client, the connection(s) may be through one or more intranets of the customer; and when it is external to the customer, the connection(s) may be through the Internet.

Traditionally, IT service provided to a given customer, e.g., customer 108a, by the IT service end user 102 typically involves collecting relevant data from the customer 108a and/or service providers of customer 108a, and provide system/service/user administration based on the data collected. Using user administration as an example, customer 108a may have a set of users internal to the customer 108a (e.g., sales department of customer 108a), and customer 108a may employ multiple cloud/software services for these users. Traditionally, user management in this scenario would involve user management for customer 108a, and user management for each individual cloud/software service. For instance, if a user is to be added to the sales department of customer 108a, not only is a user management action of adding the user to the sales department group of customer 108a (e.g., a user group called "sales" created for customer 108a) needed, but also is it needed for the individual cloud/software service. The user management action may involve supply new user information such as the user's first and last name, phone number, organization email address, age, one or more departments/groups the user belongs to, and/or any other information. Each individual software/cloud service may also need its idiosyncratic information for fulfilling the software/cloud service to this new user. This process can thus be laborious and tedious especially when a large amount of users need be add/deleted/edited within customer 108a. The complexity of IT service tasks for customer 108a can drastically increase when multiples steps and services are involved.

Figure 2:
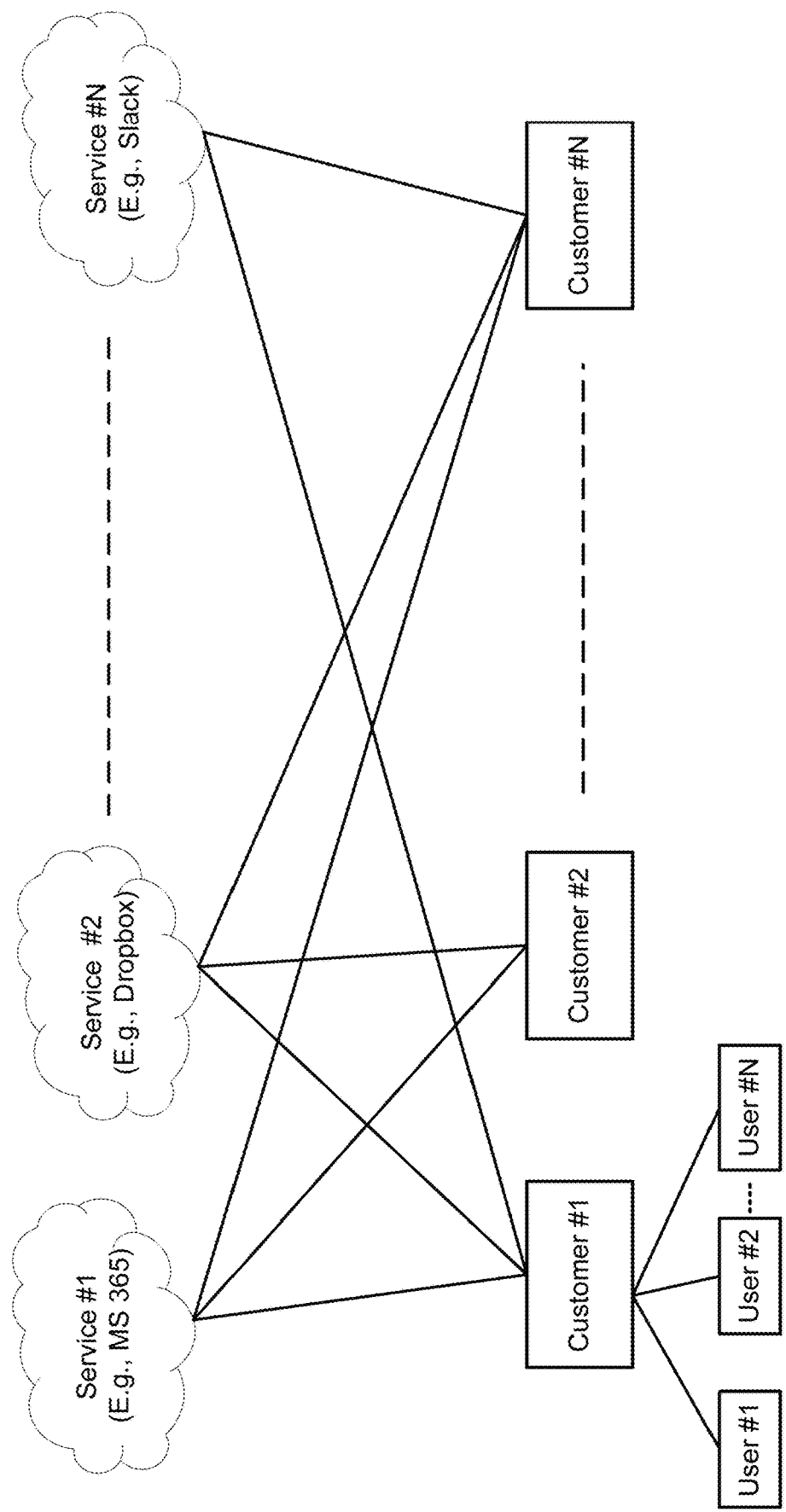
FIG. 2 illustrates an example of client-service relations in accordance with the present disclosure.

FIG. 2 illustrates an example of customer-service relations for the IT service end user 102 in accordance with the present disclosure. Typically, a customer of the IT service end user 102, such as customer 108a, may subscribe to many cloud services. For example, customer #1 may subscribe to service #1 (e.g., Microsoft Office 365), service #2 (e.g., Dropbox), and/or service #N (e.g., Slack). In some implementations, customer #1 may have different users subscribing to different services depending on, for example, corporate management policies and service subscription agreements. For example, customer #1 may hire a new employee user #1 for its sales department. User #1 is supposed to subscribe to service #1 and service #2 to perform for his business role. In the onboarding procedure, the IT department of customer #1 equipped with a conventional management system must configure service #1 and service #2 for user #1 separately. Personal information of user #1 required for configuration of service #1 must be repeated for configuration of service #2. If user #1 transfers to another department where service #3 is required, the IT department of customer #1 equipped with the conventional management system must repeat the configuration process again to input the personal information of user #1. With the growth of customer #1, user number may increase dramatically. The repeated configuration process may consume considerable resources of customer #1. In some implementations, a management system based on a graph database is proposed to reduce the repeated configuration process.

II. Activity Logs

One insight provided by this present disclosure is that within the IT service end user 102, staff may have different levels of experience. Typically, the IT service end user 102 provides IT services to multiple customers. As shown in FIG. 2, an individual customer of the IT service end user 102 may employ multiple services for its employees and relies on the IT service end user 102 to manage those services. The IT service end user 102 delegates certain tasks to individual ones of staff. The IT service end user 102 may wish to manage the staff in providing IT services to a given customer, such as customer 108a shown in FIG. 1.

Traditionally, logs are typically used to record events that happen within a system. Typically, there are roughly two types of logs—system logs and user logs. System logs are typically used to capture events that happened within the system. These events typically involve certain commands performed by the system to cause state changes on the system. User logs are typically used capture user actions that happened within the system. These events typically involve one or more actions performed by the users in the system, such as an execution of a command, certain information obtained by the user from the system, certain information input to the system by the user, and/or any other types of user activities.

Traditionally, for capturing system logs or user logs, a layer of monitoring service is employed. For example, certain operating system implements log services that monitor events within the system. When events of interest are monitored by the log services, entries of such events are recorded into a log file. Entries in the log file are typically arranged chronically according to their occurrence orders in time.

The activity log in accordance with the disclosure is an improvement over the prior art logging mechanism in several aspects. In a first aspect, the activity log in accordance with the disclosure captures a wealth of information rather than merely recording that an event has taken place at some time point. The information captured by activity log in accordance with the disclosure can include the following: for which customer was a command invoked, which user within the IT service end user 102 invoked that command, for which service was the command invoked, a status of the execution of the command, one or more input parameters to the command invoked, one or more outputs of the execution of the command, one or more applications and/or environments in which the command was executed by the user, and/or any other information. Such information can help certain users within the IT service end user 102—such as a power user—review and track activities by regular users within the IT service end user 102. This can assist the IT service end user 102 to better understand its staff's IT service activities to its customers. In certain cases, this can help the IT service end user 102 identify and/or correct mistakes committed by its staff when providing IT services to customers of the IT service end user 102. This type of activity logging can fill in gaps in audit trails of applications on the management system interfaces such as interface 112 shown in FIG. 1. This type of activity logging can also offer a unique and full view of user activity as an audit trail when mistakes need to be researched or malicious activities tracked down.

In a second aspect, a graphic user interface (GUI) may be provided to enable a power user within the IT service end user 102 to monitor and/or review an execution of a command by a regular user within the IT service end user 102. In this GUI, the power user may be enable to not only review an output of the execution of the command by the regular user, but also track a progress of the execution of the command, reviewing one or more exceptions or faults of the execution of the command in the application where the command was executed by the user under review. In one implementation, an interface showing a live progress of the execution may be brought up such that the power user can monitor the execution of the command by the regular user before the execution is completed. In another implementation, the power user may click an entry of the activity log and be transitioned to an environment or an application where the command was requested to be executed to review a context of the execution (e.g. where a fault or exception has happened).

In still another aspect, activity logs for user activities across different service for different customers at different time points may be sorted by customers or by services. In this way, user activities related to a given customer can be identified and presented to the power user for tracking and monitoring. Typically, within management system 100, users of the IT service end user 102 run commands for different customers at different time points. For instance, user #1 of the IT service end user 102 may run a command for customer 108a at a first time point, user #2 may run another command for customer 108b at a second time point, user #1 may run still another command at the third time point and so on. Thus, chronically the user activity logs will be across different customers. In an interface according to the disclosure, user activity log can be sorted according the customers, services, time, and/or any other factors. In this way, different views of user activities can be quickly assembled in this multi-customer IT service environment.

Figure 3:
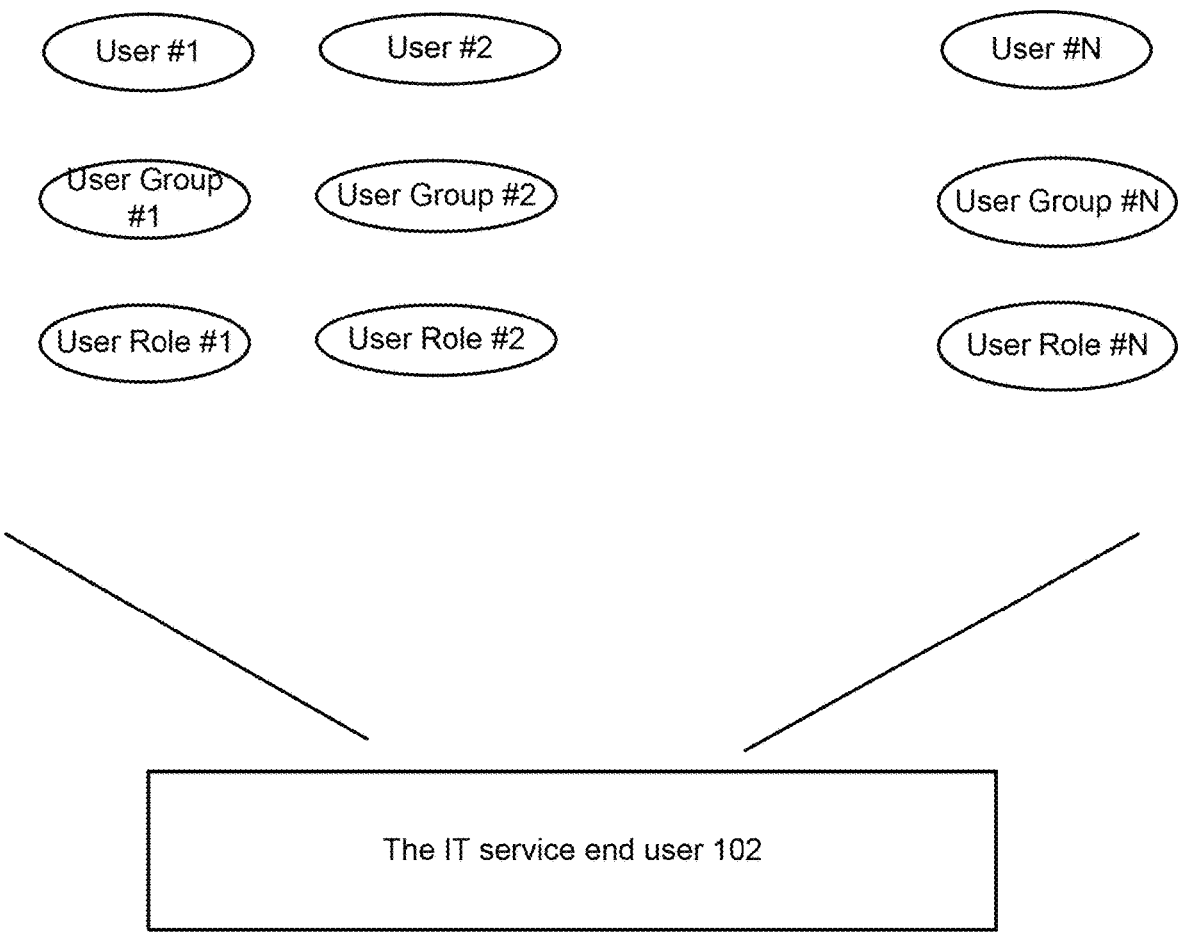
FIG. 3 shows an example user environment within IT service end user.

FIG. 3 shows an example method environment within the IT service end user 102. As can be seen in FIG. 3, the IT service end user 102 may have staff (such as users #1 to #N shown in this example) that the IT service end user 102 delegates IT service roles to its customers. These individual users may perform IT service tasks across customers of the IT service end user 102. Traditionally, users within an administration group have super user power (e.g., root power) that can perform any commands within a system without limitations. Trust is given to such users to perform system level administration. As mentioned above, in accordance with the disclosure, activities for certain users within the IT service end user 102 however may be tracked and/or monitored for diagnostic, training, and/or policing purposes. This can help the IT service end user 102 to scale up its IT services to multiple customers. Experience levels of user #1 to #N may vary. One way of reflecting such differences is to group these users into different groups. For example, in FIG. 3 users #1 to #N may be grouped into user group #1 to #N— for instance, power user group, regular user group, junior user group and/or any other user group. In this way, activities of users that are assigned to certain user groups may be tracked and monitored. For example, activities of users in the regular user group and junior user group can be tracked and monitored.

As also shown, in this example, individual users may be assigned one or more roles within the IT service end user 102. These roles may be associated with customers and/or services. For example, user #1 may be assigned to a role of a super user for customer 108*a*, and user #2 may be assigned to a role as an IT manager of a sales group for customer 108*a*. Based on such different roles, activities of users of certain roles can be monitored and tracked. For instance, user #1 (the super user for customer 108*a*) may track activities of user #2 (the IT management of sales group for customer 108*a*) through activity logs. In this way, user permissions or powers can be delegated and their activities can be tracked for training, diagnose, policing and/or any other purposes.

Proxy Module

In some embodiments, for achieving activity logs in accordance with the disclosure, a proxy module technique is employed. In this technique, a proxy module is created for a command. For example, without limitation, the command may be a get-user call of MS 365 such that when this command is invoked, a list of users and their user information will be returned from MS 365. This command may be provided by MS 365 as a standard API call by MS 365. In those embodiments, a corresponding proxy module is created on the management 100 for this command such that when management 100 receives this command from the user, it automatically substitutes this command with the corresponding proxy module. In this embodiment, proxy modules may be created for individual commands to a given service on the management system 100. Within a given proxy module, intelligence for achieving activity logs within the IT service end user 102 can be implemented.

Figure 4:
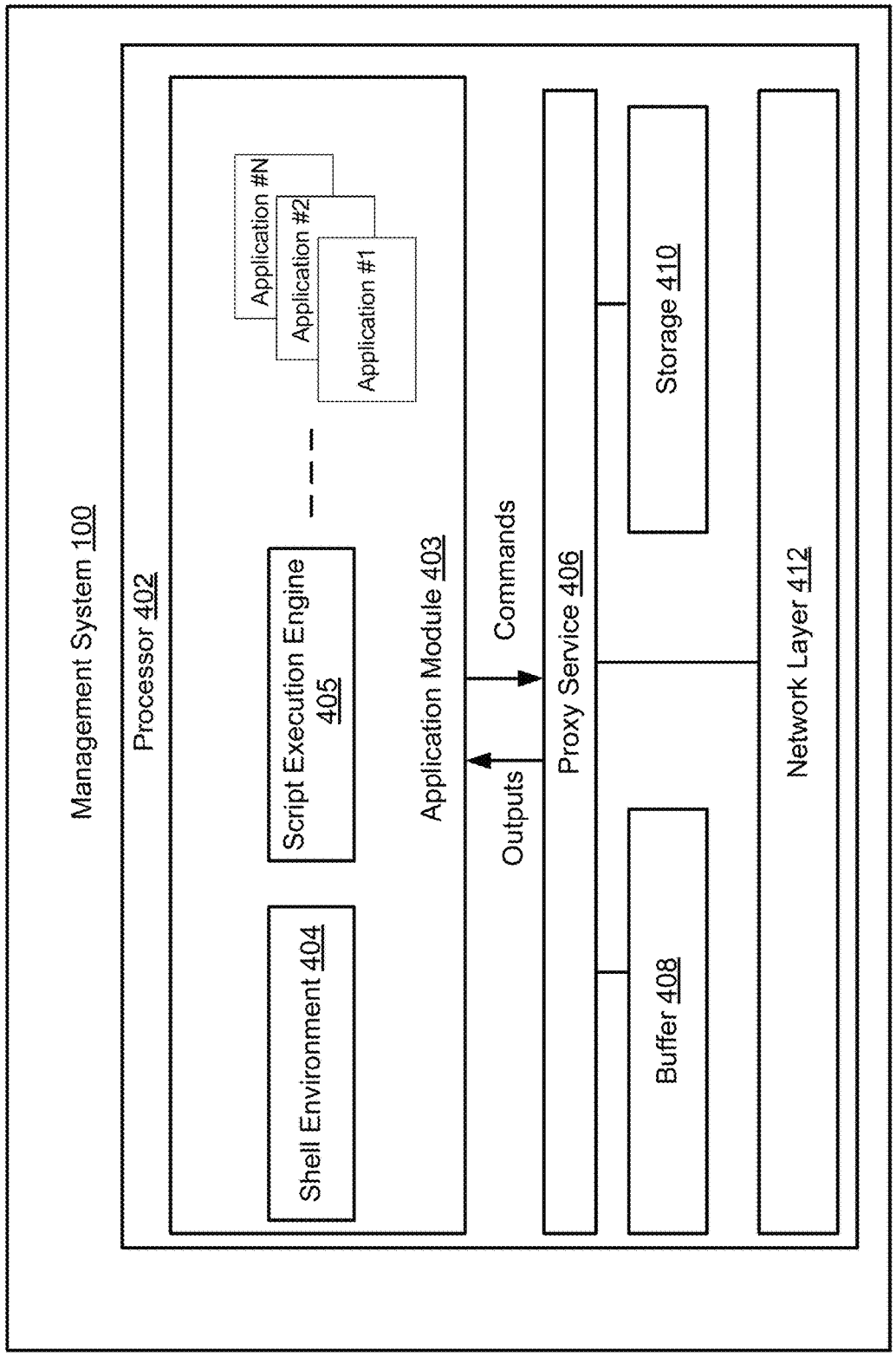
FIG. 4 shows an example implementation of a proxy module in accordance with one embodiment.

FIG. 4 shows an example implementation of a proxy module in accordance with one embodiment. As shown, the management system 100 (shown in FIG. 1) can include a processor 402 configured to execute computer programs. As shown, in this example, the computer programs executed by the processor 402 can include an application module 403. The application module 403 may comprise a shell environment 404, a script execution engine 405, one or more applications and/or any other entities. The shell environment 404 can be configured to receive one or more commands from a user within the IT service end user 102. In accordance with the present disclosure, commands to a given service may comprise at least two types—provider commands or customized commands. Provider commands are typically provided by a service provider, such as MS 365, Dropbox, etc. These commands may be published as standard API calls to the service provider for accessing/creating/managing resources within the given service. Customized commands may be developed by a third party such as the IT service end user 102 or the provider of the management system 100. One example of customized commands may include scripts authored by the IT service end user 102 for automating one or more tasks within the given service. However, this is not necessarily the only case. Another example of customized commands may include wrap-around commands, which may be created by wrapping around corresponding provider commands for providing extra intelligence when executing the provider commands.

Figure 8:
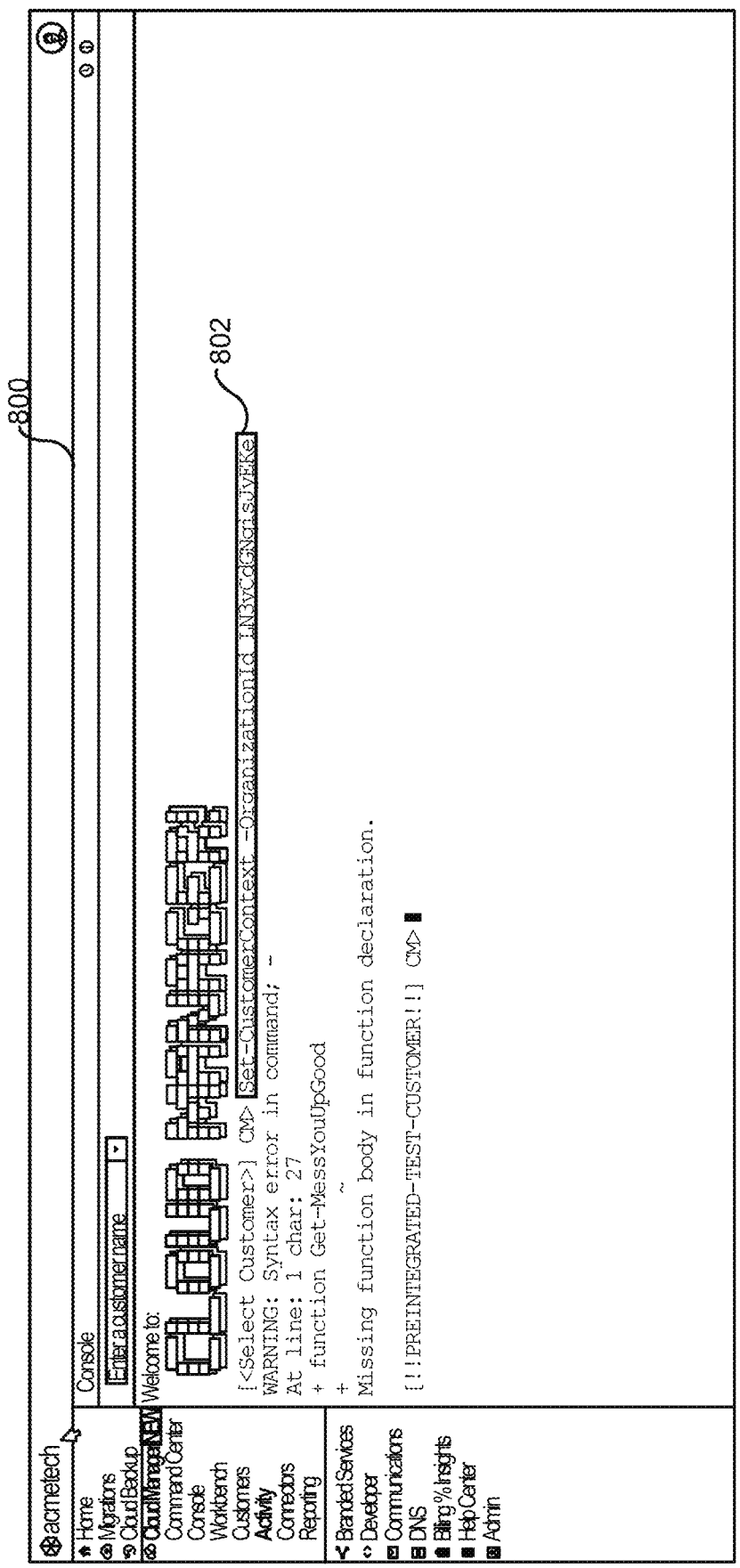
FIG. 8 shows an example interface of a command line tool.
Figure 9:
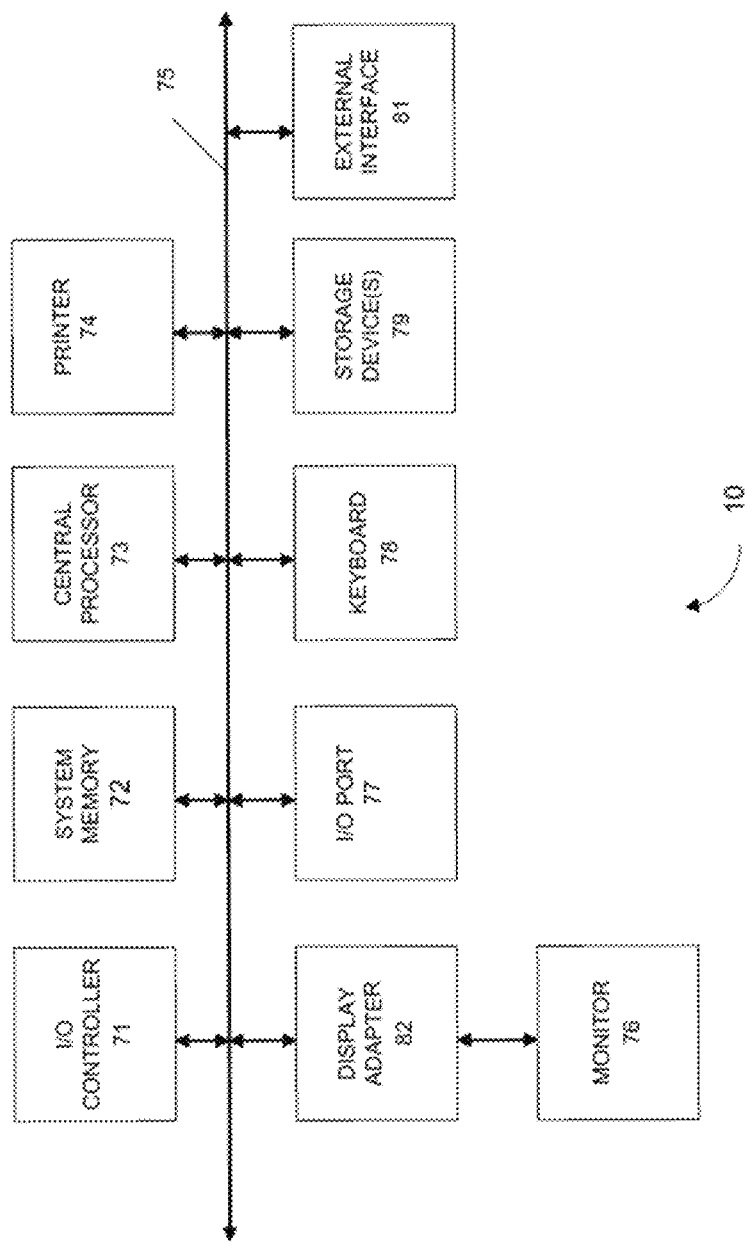
FIG. 9 shows an example computer apparatus for implementing various embodiments in accordance with the disclosure.

FIG. 8 illustrates one example command line interface 800 that employs the shell environment 404 in accordance with the disclosure. As can be seen a command "setCustomerContext" can be entered by the user for a customer with a specific "OrganizationId". Once the command 802 is received by the shell environment 404, call to the proxy service 406 is made. Another source for receiving a command from the user is through script execution engine 405 in this example. Scripts containing multiple commands may be executed automatically by the script execution engine 405. Still another source for receiving a user command is through an individual application within the management system. For example, a GUI may be provided to the user to execute a workflow for a given customer. The workflow may involve executing multiple commands. Another example is the command line tool shown in FIG. 8. Other examples of applications that can receive a command from the user are contemplated.

In any case, as shown, the command received by the application module 403 may be forwarded or intercepted by the proxy service 406 also executed by the processor 402. In accordance with the present disclosure, the proxy service 406 provides intelligence when executing a specific command. As mentioned, a provider command typically involves a standard API to the service provider such as MS 365. The provider command typically only focus on certain task(s) to cause the service provider system to make a state change and/or return some information to the IT service end user 102. Thus, the provider command typically does not provide features for tracking and/or monitoring an execution of the provider command at the service provider system. In the case of customized command (or script), the focus is typically on automation of a task or tasks for one or more customers at one or more services employed by the customer(s). While a debug or log feature may be added to script to capture a state of the execution of the script, such a feature typically only involves capturing certain events (such as exception or faults) and/or outputs from the execution of the script in a log file.

An insight provided by the present disclosure is that progress of a command execution may be recorded as it is being performed at the service provider's system. This progress may comprise live output(s) from the system regardless of success or failure of the command execution at the service provider's system. Traditionally such a progress is not captured or logged through a log file. Traditionally, only a status of the command execution is captured in a log file—whether the command execution was successful. The progress capturing can assist a power user within the IT service end user 102 to track and/or monitor regular users within the IT service end user 102 in at least two ways. One is that results of the command execution may be reviewed by the IT service end user 102 in an application (such as the command line tool shown in FIG. 8 or a GUI tool) where the command under review was run by the regular user under review. Traditional log files only capture outputs from the command execution for a later review and a reviewer would still have to open the application where the command was run if the reviewer would like to diagnose or replay the execution of the command based on those outputs.

In another way, a live progress of a command execution on the provider's system may be monitored and tracked by a power user of the IT service end user 102 as if it were run by the power user. That is, the power user is enabled to monitor any given current running activities of a given regular user. Since the power user can monitor this progress in the application where the command is being executed, the power user can control the progress of the command execution. For example, the regular user may run a sensitive command that makes a change to a state of the service provider's system for a given customer. In that example, the power user may be notified as he/she desires, he/she can bring up the progress of the command execution in the application where the command is being run by regular user. If the power user spots an issue with the execution of the command, the power user can have a control of the command execution—for example terminating the command execution immediately. This provides a layer within the IT service end user 102 that can help better police user activities in providing IT services to the customers of the IT service end user 102.

In implementation, for achieving the activity log in accordance with the disclosure, the proxy service 406 is provided to substitute a command being executed by an application within the application module 403. One or more proxy modules may be created for individual commands. For example, a proxy module "MSonline/get user-name.px" may be created for a command "MSonline/get user-name", which is a standard API call to MS 365 to get a list of users. One or more proxy modules may be created for a given command. For example, different "MSonline/get user-name.px" may be created for different customers to account for different versions of this commands. The proxy modules can be stored in storage 410, which may be a database. When the proxy service 406 receives or intercepts a command, it may consult storage 410 to find corresponding proxy module for that command.

Within the proxy module, intelligence for activity logging in accordance with the present disclosure can be configured. For example, inputs and outputs of the execution of the command may be stored in a buffer 408 shown in FIG. 4. Other information related to the execution of the command may also be stored in buffer 408—for example, such as pointer to the application where the command was run by the regular user (e.g., the command line tool shown in FIG. 8), one or more input parameters to the command, a context in which the command was run in the application (e.g., execution stacks in the shell environment 404 running the command including any error, fault, and/or exception during the execution), information regarding the customer for which the command was run, and/or any other information.

As shown in this example, once the proxy service 406 determines an appropriate proxy module to be used for the command received or intercepted, it runs proxy module, which also executes the command (e.g., through the network layer 412) and as well as capturing various information mentioned above related to the execution of the command into the buffer 408. The buffer 408 can be used by one or more interfaces to enable the power user of the IT service end user 102 to monitor and/or track a progress and/or results of the execution of the command.

Example Method

Figure 5:
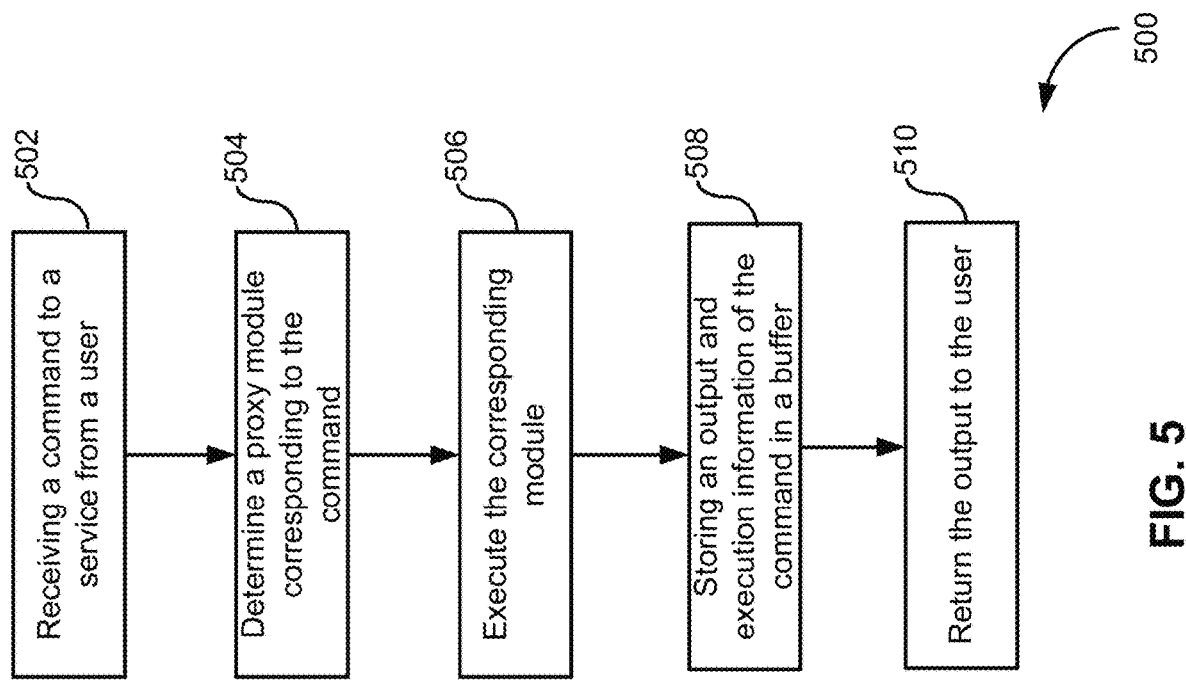
FIG. 5 shows an example interface illustrating just-in-time authentication of administrator or staff of an IT service end user according to the present disclosure.

FIG. 5 shows one example method 500 for achieving activity logging in accordance with the present disclosure. The operations of method 500 presented below are intended to be illustrative. In some embodiments, method 500 may be accomplished with one or more additional operations not described and/or without one or more of the operations discussed. Additionally, the order in which the operations of method 500 are illustrated in FIG. 5 and described below is not intended to be limiting.

In some embodiments, method 500 may be implemented in the management system 100 and/or one or more systems 104*a*-104*n* shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be designed for execution of one or more of the operations of method 500.

At a 502, a command to a service may be received from a user within the IT service end user 102. As mentioned above, the command may be entered by the user through an application such as a command line tool or GUI within management system 100. In some embodiments, the command may be a result of the user executing another command. For example, a first command to a given service may call another command to the given service. Operations involved in 502 may be implemented and executed by a proxy service similar to or the same as the proxy service 406 described and illustrated herein.

At 504, a proxy module corresponding to the command received at 502 can be determined. As mentioned, the proxy module may be created for the command and stored in a storage within or coupled to management system 100. It should be understood, in implementation, the user may not be made aware of that the proxy module determining operations. From the user's perspective, he/she may just know the command is being executed on the service provider's system. In some examples, proxy module may be determined by another proxy module. For instance, using the example described above, the first proxy module for the first command may call second proxy module for the second command. Operations involved in 504 may be implemented and executed by a proxy service similar to or the same as the proxy service 406 described and illustrated herein.

At 506, the proxy module determined at 504 may be executed. As mentioned above, intelligence for achieving the activity logging in accordance with the present disclosure may be configured into proxy module. Operations involved in 506 may be implemented and executed by a proxy service similar to or the same as the proxy service 406 described and illustrated herein.

At 508, an output and execution information of the command may be stored in a buffer. As mentioned, the execution information may include a wealth information such as an execution context of the command, one or more input parameters to the command, from which application the command was run, a pointer to that application, for which customer the command was run, one or more execution statuses of the command, one or more exceptions and/or faults caused by the execution of the command, and/or any other execution information of the command. As mentioned, the execution information involved in 508 may be obtained from the service provider's system (such as the output of the command, and faults and exceptions during the execution of the command), and as well as from the management system 100 (such as the execution context of the command, and application from which the command was run). The buffer may be available for other applications such as a GUI tool that will be described in FIG. 6 to present user activities to a power user of the IT service end user 102. Operations involved in 508 may be implemented and executed by a proxy service similar to or the same as the proxy service 406 described and illustrated herein.

At 510, an output of the execution of the command can return to the user. For example, the output can be presented in the application where the command was run by the user. Operations involved in 510 may be implemented and executed by a proxy service similar to or the same as the proxy service 406 described and illustrated herein.

Example Interfaces

Figure 6:
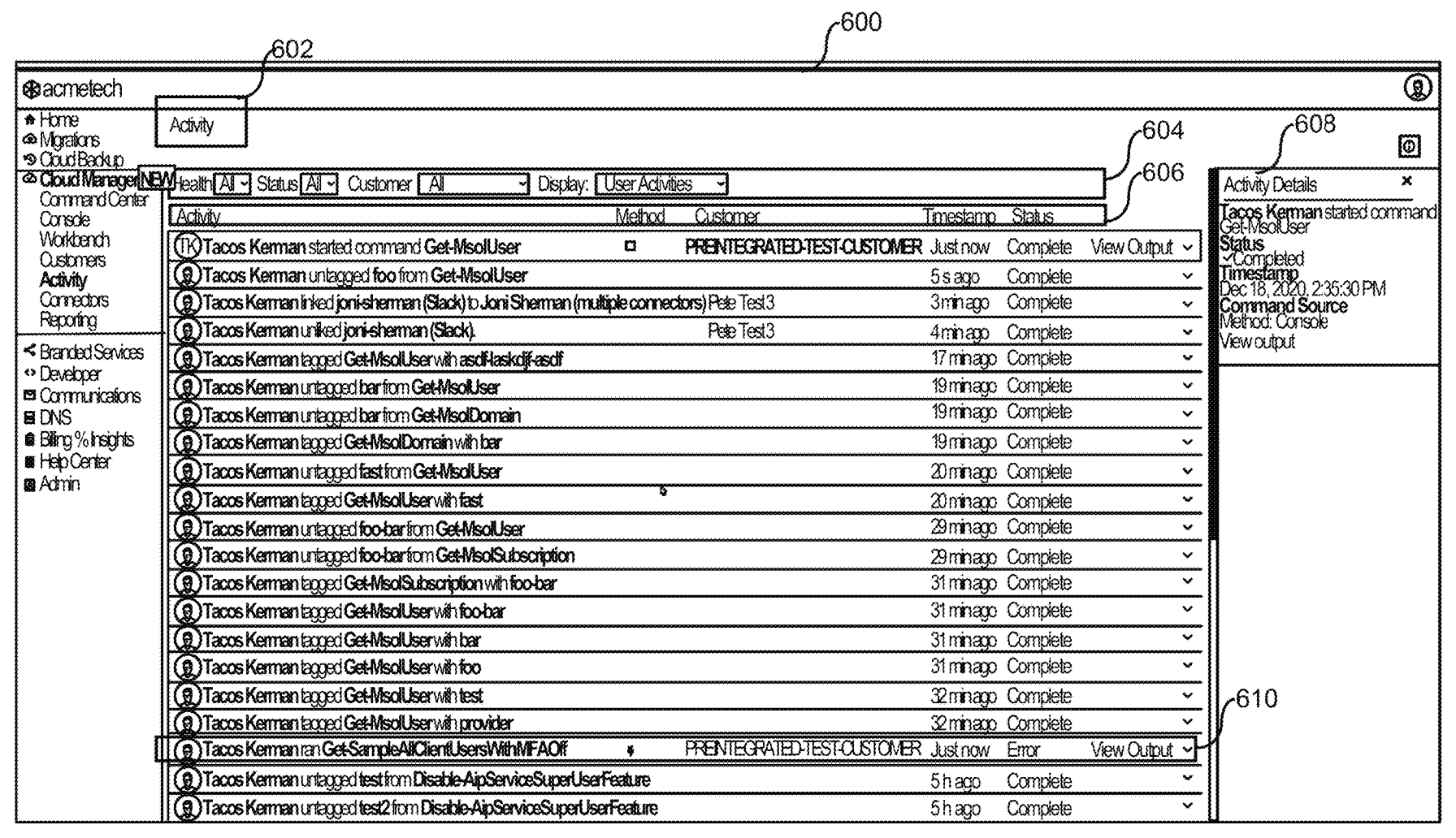
Figure 7:
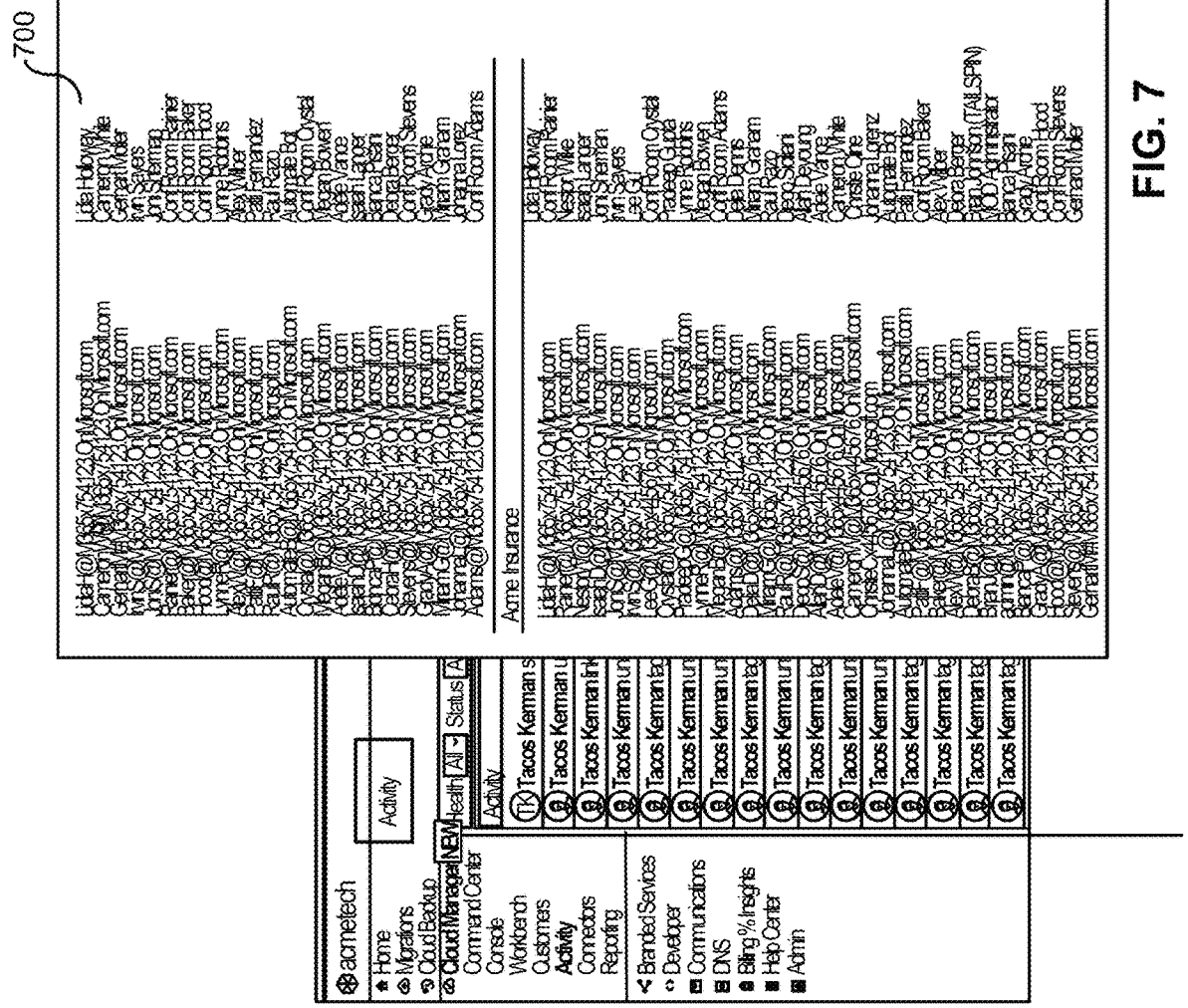
FIG. 7 shows an example interface displaying an output of an execution of a command captured in an acidity log within the IT service end user.

With the example system and method for achieving the activity logs within the IT service end user 102 in accordance with the disclosure having been disclosed, attention is now directed to FIGS. 6-8, where example interfaces are described and illustrated to facilitate a power user within the IT service end user 102 to review the activity logs. These interfaces may be implemented by the management system 100 shown in FIG. 1 and presented on terminals 106a-n within the IT service end user 102.

FIG. 6 illustrates one example interface 600 to facilitate a user within the IT service end user 102 to review user activities within the IT service end user 102 in accordance with the present disclosure. As shown, the interface 600 may comprise a title block 602 indicating to the user—e.g., a power user within the IT service end user 102, he/she is examining user activities within the IT service end user 102. At block 604, a simple search tool can be provided as shown. In this example, the search tool is configured to allow the power user to select what kind of user activities he/she may desire to review as mentioned above. In this case, the power selects to review all user activities. At 606, display column regarding the user activity information being displayed is presented. As can be see the columns include details of the activities, method of the activities (e.g., from which application was performed), for which customers the activities were performed com- pared to a current time, statuses of the activities, and option to view one or more outputs of the individual activities. For each individual activity in the log, a detail information pane 608 may also be presented to show more information about the activity. A shown in this example, the information displayed in the detail information pane 608 corresponds to entry 610 in the activity log. As shown, the user "Tacos Kerman" ran a command "Get-MsoIUser" for a specific customer. The execution of that command has a complete status but with error. As shown, the power may be enabled to act on the "view output" option, which takes the power user to the interface shown in FIG. 7.

FIG. 7 shows an example interface 700 displaying an output of an execution of a command captured in an acidity log within the IT service end user 102. As mentioned above, when the power user clicks on "view output" option in an entry of the activity logs shown in FIG. 6, the interface 700 may be presented to the power user to enable the power user to view the output the execution of the command ("Get-MsoIUser") in a console window as shown. Because the command was executed from the console as indicated by the method entry in that activity log, the output is shown in console window in FIG. 7. As mentioned, the output shown in FIG. 7 may be stored by proxy service 406 in a buffer and interface 700 may refer that buffer for presenting the output to the power user. As also mentioned, in another situation, the interface 700 may be brought up by the power user as the command is being run. That is, interface 700 may be brought up by the power user even when the command is not completed. In that way, the power user is enabled to monitor and track a live progress of the execution of the command.

FIG. 8 shows an example interface 800 of a command line tool. In the interface 600 shown in FIG. 6, if the power user desires to review the error of the entry 610, he/she can click on the "error" option, which will bring up the interface 800. As shown, interface 800 is the command line tool (console) where the user "Tacos Kerman" executed the command "Get-MsoIUser"). As shown, once the interface 800 is presented, the errors or exceptions during the execution of the command is presented as is in the interface 800. In addition, block 802 also shows input parameters to the Get-MsoIUser command can be displayed. This can enable the power user to right away review the execution of the Get-MsoIUser and the errors in the application where the command is run (as compared to traditionally such an error is captured in a text log file) and to determine if there is a mistake in using the command by the regular user (e.g., by checking if the input parameters are incorrectly supplied by the regular user).

III. Computer System

Any of the computer systems mentioned herein may utilize any suitable number of subsystems. Examples of such subsystems are shown in FIG. 10 in computer system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 10 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for facilitating capturing and presenting user activities for an IT service end user, the method being implemented by one or more computer servers and comprising:
   storing individual proxy modules for facilitating capturing the user activities during execution of individual commands, wherein the individual proxy modules correspond to individual commands;
   receiving a request to execute a command to a service for a customer from a user;
   determining a proxy module corresponding to the command;
   executing the proxy module, wherein the execution of the proxy module comprises:
      capturing a progress of the execution of the proxy module;
      notifying another user to review the progress of the execution of the proxy module; and
      obtaining execution information from the one or more computer servers, wherein the execution information includes an execution context in which the command is being executed, the execution context including information indicating an application in which the command is requested to be executed by the user and one or more input parameters to the command;
   obtaining an output of the command;
   storing the execution information, and the output of the command in a buffer to facilitate a presentation of the execution information and the output of the command in an interface; and
   returning the output of the command to the user.

2. The method of claim 1, wherein the execution information further includes at least one of: an identification of a customer for which the command is requested, a status of the execution of the command, and a time point relative to a current time, the time point being when the command is request to be executed.

3. The method of claim 1, wherein the execution of the proxy module comprises: storing a reference to the application in which the command is requested to be executed in the buffer, wherein the reference is for enabling presentation of the command execution in the application.

4. The method of claim 1, wherein the user is a first user and the method further comprises:
receiving a request to review the execution of the command from a second user within the IT service end user; and
implementing the interface to show the execution information of the command for presentation on a computing device associated with the second user.

5. The method of claim 4, wherein the request to review the execution includes a request to review an error during the execution of the command, and the interface includes an option for the second user to view the error in the application where the command is requested to executed.

6. The method of claim 4, wherein the user is a first user, the command a first command, the service is a first service and the customer is a first customer, and the method further comprises:
receiving a request to execute a second command to a second service for a second customer from a third user;
determining a proxy module corresponding to the second command;
executing the proxy module, wherein the execution of the proxy module comprises:
obtaining execution information from the one or more computer servers, wherein the execution information includes an execution context in which the second command is being executed, the execution context including information indicating an application in which the second command is requested to be executed by the third user; and
obtaining an output of the second command;
storing the execution information and the output of the second command in the buffer to facilitate a presentation of the execution information and the output of the second command in the interface.

7. The method of claim 6, wherein the interface is implemented to show the first command is executed by the first user for the first customer and the second command is executed by the third user for the second customer.

8. The method of claim 7, wherein the interface is implemented to present a search tool to enable organizing user activities according to customers serviced.

9. A computer system configured to facilitate capturing and presenting user activities within an IT service end user, the computer system comprising one or more processor configured to execute machine-readable instructions to cause the computer system to perform:
storing individual proxy modules for facilitating capturing the user activities during execution of individual commands, wherein the individual proxy modules correspond to individual commands;
receiving a request to execute a command to a service for a customer from a user;
determining a proxy module corresponding to the command;
executing the proxy module, wherein the execution of the proxy module comprises:
capturing a progress of the execution of the proxy module;
notifying another user to review the progress of the execution of the proxy module; and
obtaining execution information, wherein the execution information includes an execution context in which the command is being executed, the execution context including information indicating an application in which the command is requested to be executed by the user;
obtaining an output of the command;
storing the execution information and the output of the command in a buffer to facilitate a presentation of the execution information and the output of the command in an interface; and
returning the output of the command to the user.

10. The computer system of claim 9, wherein the execution information further includes at least one of: an identification of a customer for which the command is requested, a status of the execution of the command, and a time point relative to a current time, the time point being when the command is request to be executed.

11. The computer system of claim 9, wherein the execution of the proxy module comprises: storing a reference to the application in which the command is requested to be executed in the buffer, wherein the reference is for enabling presentation of the command execution in the application.

12. The computer system of claim 9, wherein the user is a first user and the computer system is further caused to perform:
receiving a request to review the execution of the command from a second user within the IT service end user; and
implementing the interface to show the execution information of the command for presentation on a computing device associated with the second user.

13. The computer system of claim 12, wherein the request to review the execution includes a request to review an error during the execution of the command, and the interface includes an option for the second user to view the error in the application where the command is requested to executed.

14. The computer system of claim 10, wherein the user is a first user, the command a first command, the service is a first service and the customer is a first customer, and the computer system is further caused to perform:
receiving a request to execute a second command to a second service for a second customer from a third user;
determining a proxy module corresponding to the second command;
executing the proxy module, wherein the execution of the proxy module comprises:
obtaining execution information from the one or more computer servers, wherein the execution information includes an execution context in which the second command is being executed, the execution context including information indicating an application in which the second command is requested to be executed by the third user; and
obtaining an output of the second command;
storing the execution information and the output of the second command in the buffer to facilitate a presentation of the execution information and the output of the second command in the interface.

15. The computer system of claim 14, wherein the interface is implemented to show the first command is executed by the first user for the first customer and the second command is executed by the third user for the second customer.

16. The computer system of claim 15, wherein the interface is implemented to present a search tool to enable organizing user activities according to customers serviced.

* * * * *